(12) United States Patent
Kishikawa et al.

(10) Patent No.: US 9,965,894 B2
(45) Date of Patent: May 8, 2018

(54) THREE-DIMENSIONAL MAP DISPLAY SYSTEM

(71) Applicant: GEO TECHINICAL LABORATORY CO., LTD., Fukuoka-shi, Fukuoka (JP)

(72) Inventors: Kiyonari Kishikawa, Fukuoka (JP); Eiji Teshima, Fukuoka (JP); Masatoshi Aramaki, Fukuoka (JP); Masashi Uchinoumi, Fukuoka (JP); Masaru Nakagami, Fukuoka (JP); Tatsuya Azakami, Fukuoka (JP)

(73) Assignee: Geo Technical Laboratory CO., LTD, Fukuoka-shi (JP)

( * ) Notice: Subject to any disclaimer, the term of this patent is extended or adjusted under 35 U.S.C. 154(b) by 52 days.

(21) Appl. No.: 14/860,580

(22) Filed: Sep. 21, 2015

(65) Prior Publication Data

US 2016/0012634 A1    Jan. 14, 2016

Related U.S. Application Data

(63) Continuation of application No. PCT/JP2014/001320, filed on Mar. 10, 2014.

(30) Foreign Application Priority Data

Mar. 25, 2013  (JP) .................................. 2013-061215

(51) Int. Cl.
*G06T 17/05*     (2011.01)
*G01C 21/36*     (2006.01)
(Continued)

(52) U.S. Cl.
CPC .......... *G06T 17/05* (2013.01); *G01C 21/3638* (2013.01); *G06K 9/34* (2013.01);
(Continued)

(58) Field of Classification Search
CPC .................... G06T 17/05; G06T 7/536; G06T 2207/30184; G06T 2200/04;
(Continued)

(56) References Cited

U.S. PATENT DOCUMENTS

| 2004/0066384 A1* | 4/2004 | Ohba ...................... G06T 15/20 345/419 |
| 2008/0198158 A1* | 8/2008 | Iwamura ................. G06T 17/05 345/419 |

(Continued)

FOREIGN PATENT DOCUMENTS

| JP | 10-83465     | 3/1998 |
| JP | 3362533 B2   | 10/2002 |

(Continued)

OTHER PUBLICATIONS

Search Report dated Jun. 3, 2014 from International Application No. PCT/JP2014/001320.

*Primary Examiner* — Ke Xiao
*Assistant Examiner* — Kim-Thanh T Tran
(74) *Attorney, Agent, or Firm* — Beyer Law Group LLP

(57) ABSTRACT

A map database stores map data in multiple levels having different levels of details. In displaying a three-dimensional map, the map data having a higher level of details is used for a close view area near the viewpoint to a predetermined distance, and the map data having a lower level of details is used for a distant view area farther from the predetermined distance. The distant view area is first drawn by a perspective projection, and then, after clearing a depth buffer that stores depth information, the close view area is drawn, such that an undesirable hidden line removal process based on the depth information is not performed between the projected image in the distant view area and that in the close view area, (Continued)

thereby avoiding an unnatural phenomenon in which part of the close view image is hidden by the distant view image.

18 Claims, 7 Drawing Sheets

(51) Int. Cl.
G09B 29/00 (2006.01)
G06K 9/34 (2006.01)
G06T 7/536 (2017.01)

(52) U.S. Cl.
CPC ............ *G06T 7/536* (2017.01); *G09B 29/005* (2013.01); *G09B 29/007* (2013.01); *G06T 2200/04* (2013.01); *G06T 2207/30184* (2013.01); *G06T 2210/36* (2013.01); *G06T 2210/62* (2013.01)

(58) Field of Classification Search
CPC ... G06T 2210/62; G06T 2210/36; G06K 9/34; G09B 29/005; G09B 29/007; G01C 21/3638

USPC ......................................... 345/419, 418, 420
See application file for complete search history.

(56) References Cited

U.S. PATENT DOCUMENTS

| | | |
|---|---|---|
| 2009/0171581 A1 | 7/2009 | Ushida et al. |
| 2012/0050285 A1* | 3/2012 | Kannenberg ........... G01C 21/32 345/419 |
| 2013/0342537 A1* | 12/2013 | Vorhies ..................... G06T 5/00 345/428 |
| 2014/0267257 A1* | 9/2014 | Overbeck ............... G06T 17/05 345/422 |

FOREIGN PATENT DOCUMENTS

| | | |
|---|---|---|
| JP | 2009-217000 | 9/2009 |
| JP | 4422125 B2 | 12/2009 |

* cited by examiner

THREE-DIMENSIONAL MAP DISPLAY SYSTEM

CLAIM OF PRIORITY

This application is a Continuation of International Patent Application No. PCT/JP2014/001320, filed on Mar. 10, 2014, which claims priority to Japanese Patent Application No. 2013-061215, filed on Mar. 25, 2013, each of which is hereby incorporated by reference.

BACKGROUND OF THE INVENTION

1. Field of the Invention

The present invention relates to a three-dimensional map display system that concurrently uses a plurality of map data to display a three-dimensional map.

2. Description of the Related Art

An electronic map displayed on the screen of, for example, a navigation system or a computer may be a three-dimensional map that expresses features such as buildings three-dimensionally. The three-dimensional map is generally displayed by drawing three-dimensional models by, for example, perspective projection.

The three-dimensional map includes a large number of features, and the ground surfaces are also expressed by polygons. This results in a large number of three-dimensional models and may significantly increase the processing load for drawing a three-dimensional map. Especially in the case of drawing a birds eye view from the high viewpoint, the display range of the map covers a wide area, so that the processing load for the display may have a remarkable increase.

In order to reduce such processing load, a plurality of map data having different levels of details are used concurrently in the case of displaying a three-dimensional map and more specifically a birds eye view map. For example, Japanese Patent Nos. JP 4422125B and JP 3362533B disclose techniques both applied to display of a three-dimensional bird's eye view map, which vertically divide the map display range into two parts, use detailed map data to display a lower area close to the viewpoint and use wide-area map data having the lower level of details to display an upper area distant away from the viewpoint.

BRIEF DESCRIPTION OF THE INVENTION

In general, map data are generated and stored in division into meshes of a predetermined size. Maps are drawn from a variety of viewpoints and in a variety of gaze directions. In the case of combined use of a plurality of map data, the boundary on the map display where the map data to be used is changed over is not necessarily identical with the boundary between meshes of the map data. Accordingly, in actual display of a map by combined use of a plurality of map data, maps may be drawn in an overlapping manner by using the plurality of map data in the vicinity of the boundary on the map display. This may cause a display disturbance due to mismatch of two map data or the display process by a graphics engine and deteriorate the appearance of map display.

This problem is not characteristic of the bird's eye view but may commonly arise in the case of a driver's view that draws a three-dimensional map from the low viewpoint as long as a plurality of map data are used for displaying the map. This problem is also not limited to map data stored in the units of meshes but is a common problem in display of a map by concurrently using a plurality of map data.

An object of the invention is to avoid a display disturbance, for example, at the boundary on the map display in the case of displaying a three-dimensional map by combined use of a plurality of map data, and to improve the appearance of map display.

According to one embodiment of the invention, there is provided a three-dimensional map display system that displays a three-dimensional map, comprising: a map database that stores map data for displaying a three-dimensional map, at each of multiple levels having different levels of map details; and a display controller that refers to the map database and displays a three-dimensional map viewed from a specified viewpoint position and in a specified gaze direction. The display controller concurrently uses map data in a plurality of different levels to draw a map, such that map data at a rougher level having a lower level of map details is used for a distant view area more distant away from the viewpoint position and map data at a finer level having a higher level of map details is used for a close view area closer to the viewpoint position. The display controller sequentially draws the map from the distant view area toward the close view area. The display controller draws the close view area over a previously drawn map, irrespective of depth at each point on the previously drawn map.

One embodiment of the invention concurrently uses map data in multiple levels having different levels of details. The map data at the finer level having the higher level of details stores data of a larger number of features such as buildings, compared with the map data at the rougher level having the lower level of details. The map data at the rougher level having the lower level of details, on the other hand, stores data of features such as major roads and buildings. The map data concurrently used for drawing may be map data in two different levels or may be map data in three or more different levels. It is not necessary that these map data are stored in units of meshes of a predetermined geographical size.

One embodiment of the invention concurrently uses map data in multiple different levels according to the distance from the viewpoint position in drawing a three-dimensional map. More specifically, the embodiment of the invention uses map data at the rougher level for the more distant view area more distant away from the viewpoint position, while using map data at the finer level for the closer view area closer to the viewpoint position. This provides the user with sufficient geographical information with respect to the close view area and enables a wide area map to be displayed with respect to the distant view area by a little processing load.

In general, hidden line removal to control drawing of polygons is performed, depending on the visibility from the viewpoint in three-dimensional graphics. The general procedure accordingly performs the display process with recording the distance from the viewpoint to each point on a polygon, i.e., depth, by some technique. One embodiment of the invention, however, draws the close view area over the distant view area, irrespective of the depth at each point in the distant view area. The close view area is thus unconditionally drawn on a priority basis at the boundary between the distant view area and the close view area, without taking into account whether the distant view area or the close view area is located at a visible position from the viewpoint in the three-dimensional model. Hidden line removal may be performed by taking into account the depth, with respect to each point in the close view area.

The inventors of this application have found that a display disturbance in an overlapped area where maps drawn by using two map data overlap with each other in three-dimensional map display by combined use of a plurality of map data is attributed to the depth processing. When there is a mismatch between a plurality of map data, the ground surface in the distant view area which is to be drawn in the lower layer may cover and hide a feature in the close view area in an overlapped area of maps drawn by using two map data. Even in the case of accurate map data, a similar problem may be caused by a rounding error. When there is a perfect match in height including the rounding error between the distant view area and the close view area, the graphics engine fails to distinctly determine which of the distant view area and the close view area is to be drawn in a visible manner. This may cause the resulting image to flicker unstably.

One embodiment of the invention draws a distant view area and subsequently draws a close view area over the previously drawn distant view area, irrespective of the depth of the distant view area. This avoids the problem caused by the depth described above and stabilizes the display in the vicinity of the boundary where the level of map data to be used for drawing is changed over, thus improving the appearance of map display.

One embodiment of the invention may employ a technique of storing the depth of the distant view area drawn first and neglecting the depth in the course of drawing the close view area.

According to one aspect of the invention, however, the display controller may clear a depth buffer that stores the depth at each point immediately before a change in level of the map data used for drawing the map, and subsequently start drawing a next area. This avoids a potential display trouble caused by the depth by the simple method.

According to another aspect of the invention, the display controller may control display not to draw a three-dimensional feature in a distant area distant away from the viewpoint position in a predetermined range including a boundary of areas where level of the map data used for drawing the map is changed over.

One embodiment of the invention neglects the depth of the distant view area in the process of drawing the close view area. A three-dimensional feature drawn in the distant view area in the vicinity of the boundary may be unnaturally hidden by the map of the close view area. This aspect controls the display not to draw a three-dimensional feature in the vicinity of the boundary, in order to avoid such a potential trouble.

The predetermined range including the boundary may be set arbitrarily by taking into account, for example, the extent of the close view area. For example, when the boundary between the distant view area and the close view area is located in a sufficient distance, features may not be drawn over the entire distant view area. In other words, only polygons representing the ground surfaces are drawn in the distant view area. This further simplifies drawing in the distant view area.

According to another aspect of the invention, the display controller may be allowed with regard to the distant view area to draw a map across an adjacent area closer to the viewpoint position. This eliminates the need to identify the boundary of the areas where the level of the map data is changed over and cut out data with respect to the distant view area, thus simplifying the display process of the three-dimensional map.

According to another aspect of the invention, the map data stored in the map database may have display level information used to control display/non-display according to distance from the viewpoint position, in relation to each feature to be displayed in the three-dimensional map. The display controller may display the map based on the display level information by using a feature designated as a display object according to the distance from the viewpoint position.

This enables display/non-display of each feature to be controlled relatively easily according to the distance from the viewpoint position. The configuration of the display level information may be set arbitrarily. For example, the display level information may be configured to specify an upper limit distance range for displaying a feature. This causes each feature at a location close to the viewpoint position to be displayed on the map, while causing a feature distant from the viewpoint position to be not displayed. This upper limit distance range may be increased for major features such as landmarks and decreased for features such as ordinary houses. This enables a large number of features to be displayed in detail in the close area to the viewpoint position, while enabling only major features to be displayed in the distant area.

As another example, the display level information may be configured to specify a lower limit distance range for displaying a feature. This causes only each feature having the distance from the viewpoint position equal to or greater than a predetermined value to be displayed. Association of such display level information with the map data for drawing the distant view area readily avoids a three-dimensional feature from being drawn in a part covered and hidden by the close view area in the process of drawing a distant view area, thus advantageously avoiding a potential display trouble.

According to one embodiment of the invention, the map database may have any of various configurations. For example, the map database may store the map data with respect to each mesh of a geographical size specified for each of the multiple levels. With respect to each mesh, the map database may store data of a large-size feature having a three-dimensional geographical size equal to or greater than a specified size and data of a small-size feature other than the large-size feature. The map database may store the data of the small-size feature in such a manner as to be readable in unit of a cell of a smaller geographical size than that of the mesh. The cell may be in a shape defined by geographically dividing the mesh, such that a data volume of the feature included in each cell does not exceed a predetermined value.

This aspect stores the map data in the units of meshes and thus facilitates management and reading. The mesh size may differ at each level of the map data. This aspect stores the features in further division into cells. Not all the features present in the mesh but only small-size features are stored in each cell. For example, long features such as the road and features occupying wide areas such as the sea may be treated as large-size features, and features occupying narrow two-dimensional areas such as buildings may be treated as small-size features.

In urban areas, there are built-up areas where features such as building are concentrated. The data volume of features is significantly increased in such built-up areas. If data are read in the units of meshes, there is a need to read large volumes of data even when part of a certain mesh other than a built-up area is used for map display. This increases the time required for processing in map display. In accordance with the embodiments of the invention, on the other hand, the map data is stored in subdivision into cells in such a manner as to be readable in the units of cells. This enables only part of a mesh required for map display, thus improving the efficiency in map display.

The invention may not necessarily include all the variety of features described above but may be configured appropriately with partial omission or by combination of these features.

One embodiment of the invention may also be configured as a three-dimensional map display method performed by a computer to display a three-dimensional map and as a computer program that causes a computer to display a three-dimensional map. One embodiment of the invention may also be configured as a computer-readable non-transitory storage medium in which such a computer program is stored.

When one embodiment of the invention is configured as a computer program or as a non-transitory storage medium in which such a computer program is stored, the configuration may include the entire program that controls the operations of the three-dimensional image output device or the background image generation device or may include only a section that achieves the functions of the embodiments of the invention. Available examples of the storage medium include flexible disks, CD-ROMs, DVD-ROMs, magneto-optical disks, IC cards, ROM cartridges, punched cards, prints with barcodes or other codes printed thereon, internal storage units (memories such as RAM and ROM) and external storage units of computers and various other computer-readable media.

DETAILED DESCRIPTION OF EMBODIMENTS OF THE INVENTION

First Embodiment

The following describes an embodiment of the invention configured as a three-dimensional map display system by using a personal computer to display a three-dimensional map on its display. The invention may be applied to an aspect incorporated as a three-dimensional map display function in another device, such as a route searching/route guide device.

A. System Configuration

Figure 1:
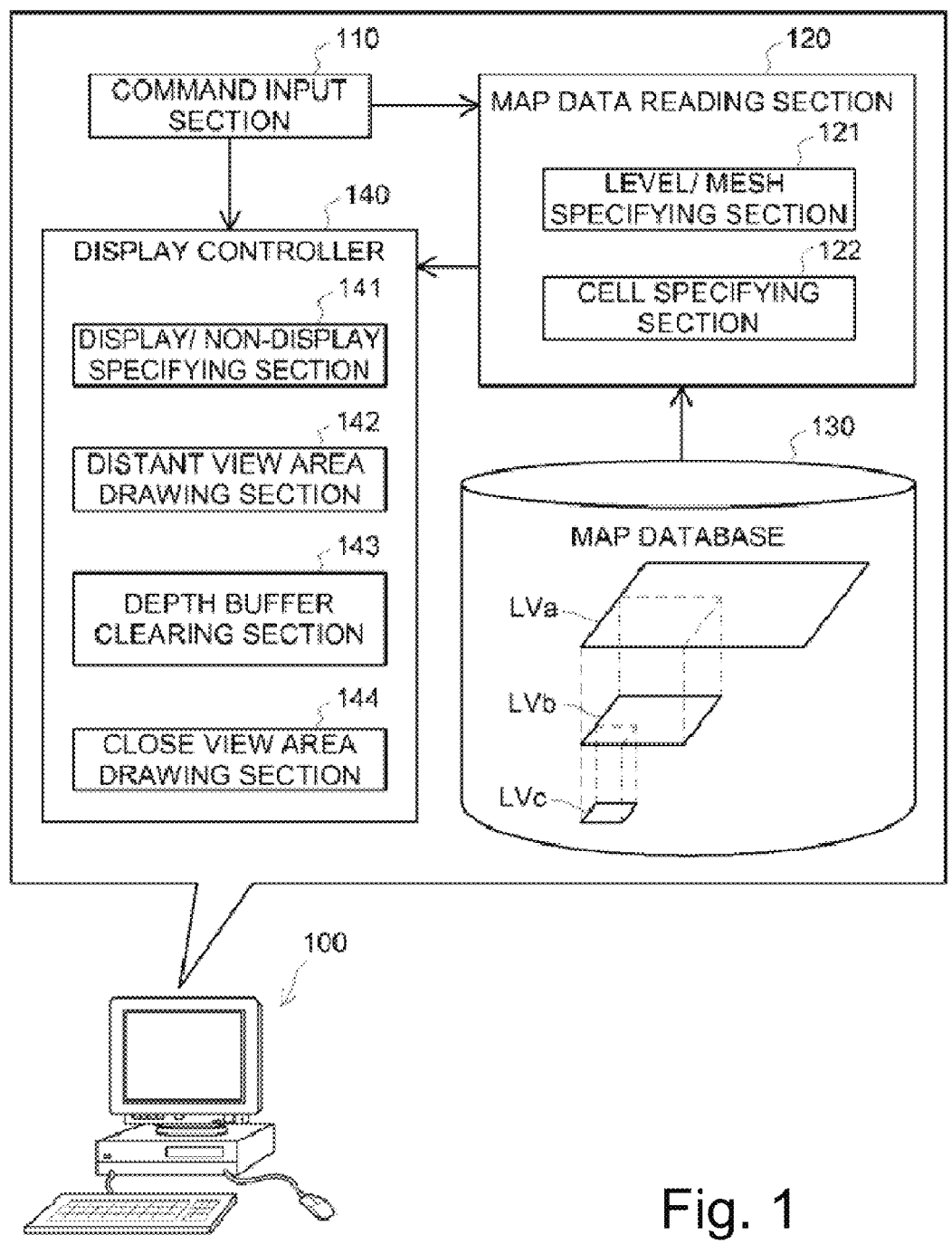
FIG. 1 is a diagram illustrating the configuration of a three-dimensional map display system.

FIG. 1 is a diagram illustrating the configuration of a three-dimensional map display system 100. The three-dimensional map display system 100 is provided as a system configured by using a personal computer to display a three-dimensional map on its display, in response to a user's instruction. This embodiment illustrates a standalone-type system using a personal computer, but the three-dimensional map display system 100 may be configured as a system in which a server storing a map database 130 and other required data is connected with a personal computer by a network. The terminal used to display a map is not limited to the personal computer but may be any of various terminals, for example, a tablet terminal, a cell phone or a smartphone.

The three-dimensional map display system 100 has a variety of functional blocks as illustrated. These functional blocks may be configured by installing software implementing the respective functions but may be partly or wholly configured by hardware.

The map database 130 stores map data including three-dimensional models indicating, for example, three-dimensional shapes of features, in order to display a three-dimensional map. According to this embodiment, the map data are stored divisionally in multiple levels LVa to LVc as illustrated. Data in each level is managed by dividing into a predetermined size of meshes. The level LVc stores data having the highest level of details, i.e., even data of narrow streets and small features. The level LVc indispensably has the large data volume and is thus managed by dividing into relatively small meshes. The level LVb has the slightly lower level of details than the level LVc. The level LVb stores data of standard-size roads and buildings with omission of data such as narrow streets. The mesh size of the level LVb is set larger than that of the level LVc. The level LVa has the further lower level of details and stores data of, for example, only main roads such as expressways and main buildings recognized as landmarks. The mesh size of the level LVa is set further larger than that of the level LVb.

The map data are stored divisionally in multiple levels as described above, but data of each feature is not selectively stored in one of these levels. For example, a main building recognized as a landmark is commonly stored in all the levels LVa to LVc. In other words, data in each level is capable of being used to display a map at the level of details corresponding to the level. According to this embodiment, the map data are managed by cells as subdivisions of meshes. This cell structure will be described later.

A command input section 110 receives a user's instructions regarding display of a three-dimensional map. The user's instructions include, for example, instructions for displaying a map such as viewpoint position, gaze direction and display range (scale).

A map data reading section 120 serves to read map data from the map database 130. A level/mesh specifying section 121 specifies which level and which mesh of data are to be used in the map database 130 according to the user's instructions such as the viewpoint position. A cell specifying section 122 specifies which cell of data are to be used in the mesh specified by the level/mesh specifying section 121. The map data reading section 120 reads data for displaying a map from the specified mesh and the specified cell.

According to this embodiment, map data in multiple levels are used in combination to display one three-dimensional map. Controlling combined use of map data will be described later.

A display controller 140 displays a three-dimensional map using the map data of the map database 130. According to this embodiment, a procedure divides a map into two areas, i.e., a distant view area distant away from the viewpoint position and a close view area close to the viewpoint position, and uses map data of different levels for the respective areas to display a three-dimensional map as described below.

A display/non-display specifying section 141 specifies display or non-display of each feature stored in the map data according to the distance from the viewpoint position. This process is common for both the distant view area and the close view area.

A distant view drawing section 142 draws a map of the distant view area. A procedure of this embodiment draws a bird's eye view by perspective projection from a specified viewpoint position. A map may alternatively be drawn from a low viewpoint position. In three-dimensional drawing, the distance of each point in projection from the viewpoint, i.e., depth, is stored in a depth buffer for the purpose of hidden line removal. In the process of drawing the distant view area, the depth of each point is stored in the depth buffer.

A depth buffer clearing section 143 initializes the value of the depth buffer stored in the process of drawing the distant view area. This process causes the drawn distant view area to constitute one two-dimensional background image without three-dimensional significance.

A close view drawing section 144 draws a map of the close view area after initialization of the depth buffer. The same viewpoint and the same projection technique as those employed for drawing the distant view area are employed drawing the close view area. In the process of close view drawing, the depth of each point is newly stored in the depth buffer, and hidden line removal is performed based on this storage. The distant view area is treated merely as the background image, so that the close view area is drawn over the distant view area.

B. Configuration of Map Database

The following describes the configuration of the map database according to the embodiment. As described previously, according to this embodiment, the map data are provided in multiple levels having different levels of details (FIG. 1). At each level, the map data are stored in units of meshes of a predetermined geographical size. In each mesh, cells are defined as divisions of the mesh, based on the sizes of respective features to be stored and their data volumes, so that data are stored in units of cells. The following first describes the concept of cells and subsequently describes the data structure.

Figure 2:
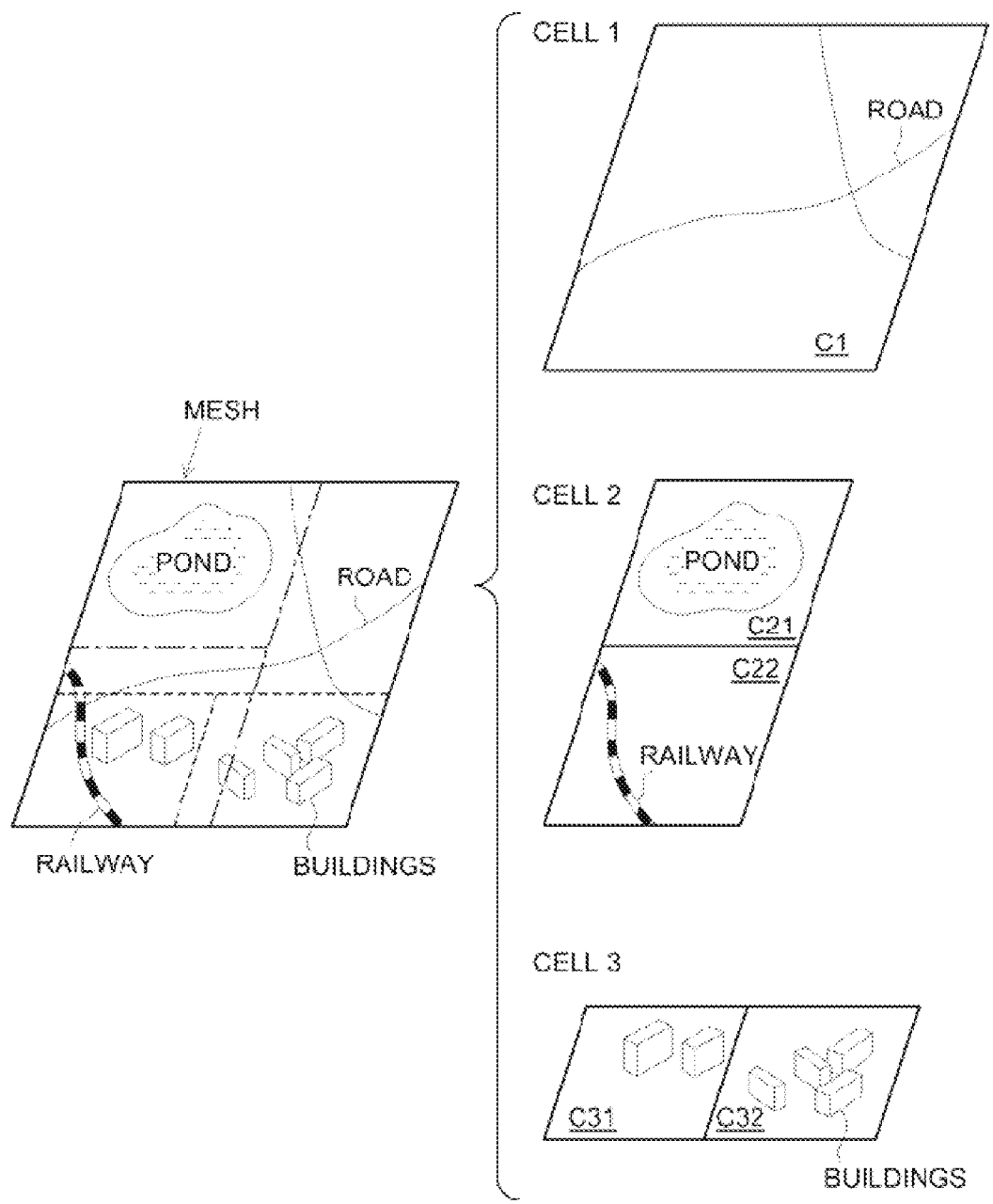
FIG. 2 is a diagram illustrating the cell structure of a map database.

FIG. 2 is a diagram illustrating the cell structure of the map database. The left-side illustration is an example of a mesh constituting map data. Feature data representing the shapes of various features are stored in a mesh. In the illustrated example, feature data of a pond, a road, a railway and a plurality of buildings are stored in the mesh. The respective features have different two-dimensional sizes. For example, the road is a "long" feature located over substantially the entire area in the mesh. Such features of relatively large two-dimensional sizes are called large-size features herein. The pond and the railway are features of medium sizes which occupy relatively wide areas in the mesh (hereinafter called "medium-size features"). Classification between the large-size features and the medium-size features is not unequivocally determined by the attributes of the features but is determinable based on the actual sizes of the respective features occupying in the mesh. For example, when there is a larger pond than that shown in FIG. 2, the pond may be classified as a large-size feature. Buildings and other features of relatively small two-dimensional sizes, other than these large-size features and medium-size features, are specified as small-size features. This embodiment classifies the features by the two-dimensional size as described above and subsequently sets cells as units for management of the features.

A cell 1 (C1) having the same size as that of the mesh is set for large-size features, as shown in the right-side illustration. Two cells 2 (C21 and C22) having the smaller size than that of the mesh are set for medium-size features. Alternatively a cell having the total size of the cells C21 and C21 may be used for the medium-size features. Whether or not the cell 2 is to be divided into two cells C21 and C21 is based on determination of whether the data volume included in each cell exceeds a predetermined upper limit. When the total data volume of the feature data of the pond and the railway exceeds the upper limit set for the cell 2, the feature data are divided into the two cells C21 and C22 to be managed. When the total data volume does not exceed the upper limit, on the other hand, the feature data are managed in one single cell having the total size of the cells C21 and C22. In this way, the shapes of the cells C21 and C22 are determined, based on the sizes of the features included in the respective cells and the data volumes of the features in the respective cells.

The feature data of small-size features, e.g., buildings, are similarly divided into two cells 3 (C31 and C32) to be managed. The shapes of the cells 31 and 32 are also determined, based on the shapes and the data volumes of the features included in the respective cells. In the illustrated example of FIG. 2, each cell 3 is not set for each building, but two buildings are stored in the cell 31 and four buildings are stored in the cell 32. This indicates that the total data volume of these plurality of buildings stored in each cell does not exceed the upper limit set for the cell.

The one-dot chain lines shown in the left-side illustration indicate the cells 2, and the broken lines indicate the cells 3. In this way, the feature data in one mesh are divided into a plurality of cells to be managed. In the illustrated example of FIG. 2, feature data are classified into three groups of features, i.e., large-size features, medium-size features and small-size features, and cells are set for the respective groups of features. According to a modification, feature data may be classified into two groups of features, i.e., large-size features and small-size features, and cells may be set for only the small-size features.

According to the embodiment, cells are not defined by simply dividing the features in the mesh based on the geographical divisions, but features are classified into a plurality of groups, such as large-size features and small-size features, and cells are set for the respective groups of features. Accordingly, reading only the cells set for any one group of features, for example, reading only the cells 3 for storing small-size features, does not allow for display of a map. It is necessary to read all the cells 1 to 3, in order to display a map appropriately. In the case that the data stored in the cell C31 is sufficient for a certain display range of the map and the data stored in the cells C32 is out of the certain display range, the procedure of the embodiment is enabled to skip reading the cell C32. This reduces the processing load for display a map.

Figure 3:
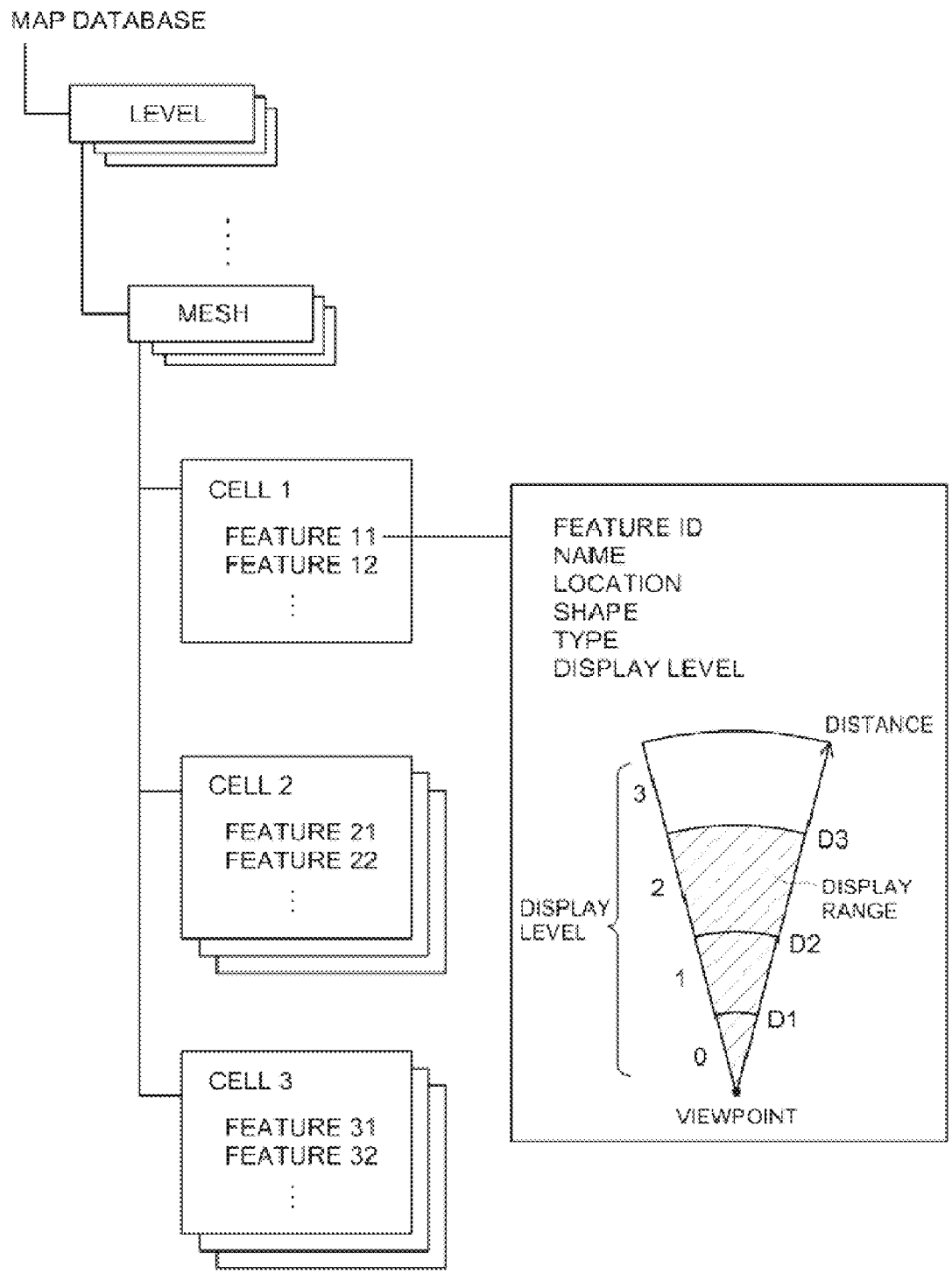
FIG. 3 is a diagram illustrating the data structure of the map database.

FIG. 3 is a diagram illustrating the data structure of the map database. The map database is managed in multiple levels as illustrated in FIG. 1. Data at each level consists of a plurality of meshes of a predetermined geographical size. Each mesh is divided into a cell 1 for storing large-size features, cells 2 for storing medium-size features and cells 3 for storing small-size features as illustrated in FIG. 2. The cells 2 may be omitted as appropriate. The cell structure in four or more levels may be employed.

The data structure for each feature is illustrated with respect to the cell 1 as an example. A variety of data as illustrated are stored for each feature as follows:

"Feature ID" indicates unique identification information of a feature; "Name" indicates the name of a feature; "Location" indicates the location of the representative point of a feature. For example, the location may be specified by the coordinate values of the center of gravity in the two-dimensional shape of a feature; "Shape" is polygon data representing the two-dimensional or three-dimensional shape of a feature; "Type" is information regarding the type of a feature, such as road or building; and "Display Level" is information used to control display/non-display of a feature according to the distance from the viewpoint in display of a map. According to this embodiment, as illustrated, the display level is specified by one of integral values 0 to 3. The display level "0" indicates display of a feature located in the range from the viewpoint to a distance D1 which is relatively close to the viewpoint. Similarly, the display level "1" indicates display of a feature located in the range from the viewpoint to a distance D2, and the display level "2" indicates display of a feature located in the range from the viewpoint to a distance D3. The display level "3" indicates display of a feature irrespective of the distance from the viewpoint, since the upper limit of the distance is not specified.

An example of the display range is shown as a hatched range in the illustration. When the display level "2" is set for a feature, the display range is a shorter range than the distance D3, i.e., the hatched range in the illustration.

C. Map Display Process

The following describes a map display process for displaying a map. This map display process is mainly performed by the display controller 140 shown in FIG. 1 and is performed by the CPU of the map display system 100 as the hardware configuration.

Figure 4:
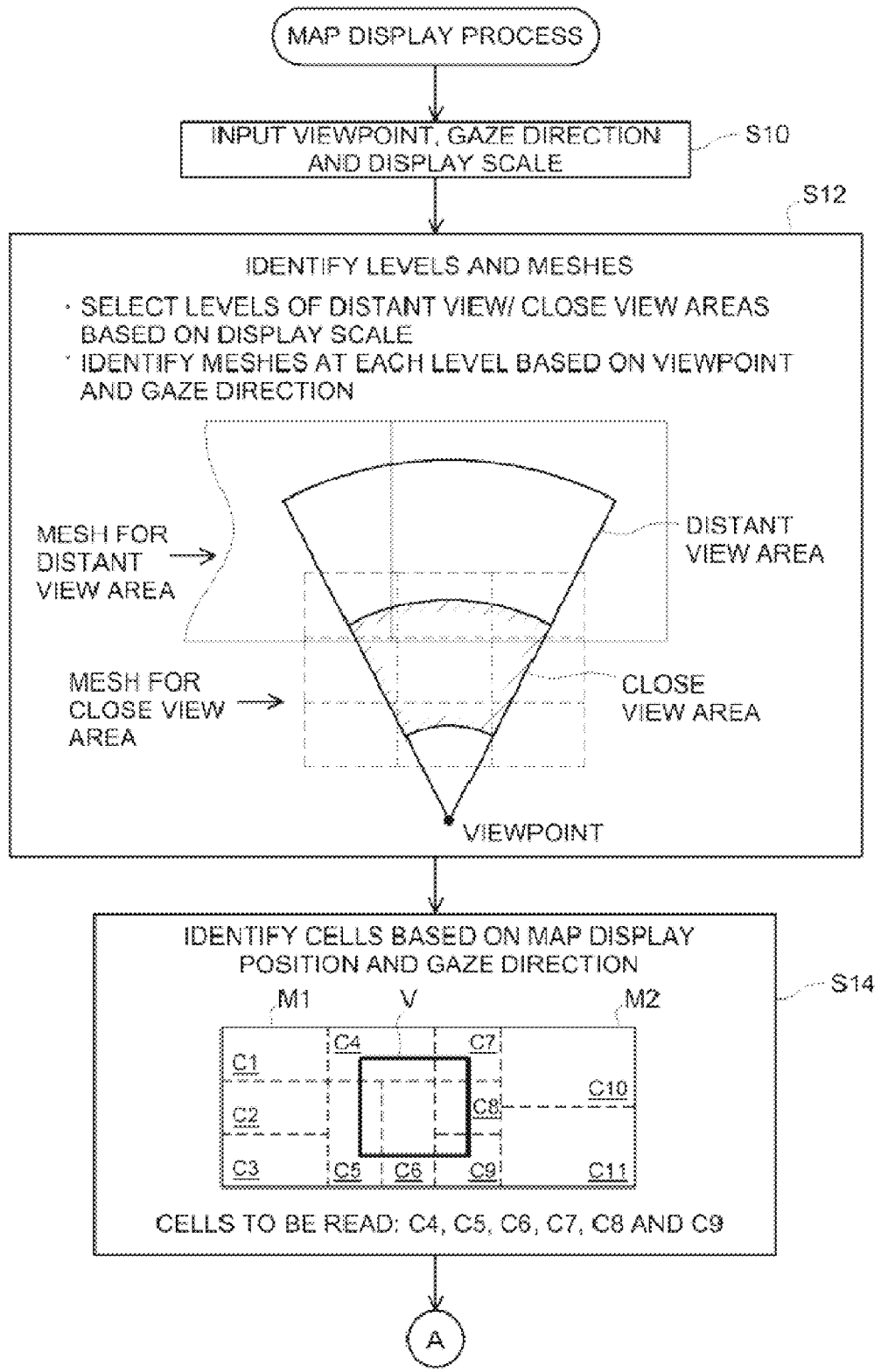
FIG. 4 is a first part of a flowchart of a map display process.
Figure 5:
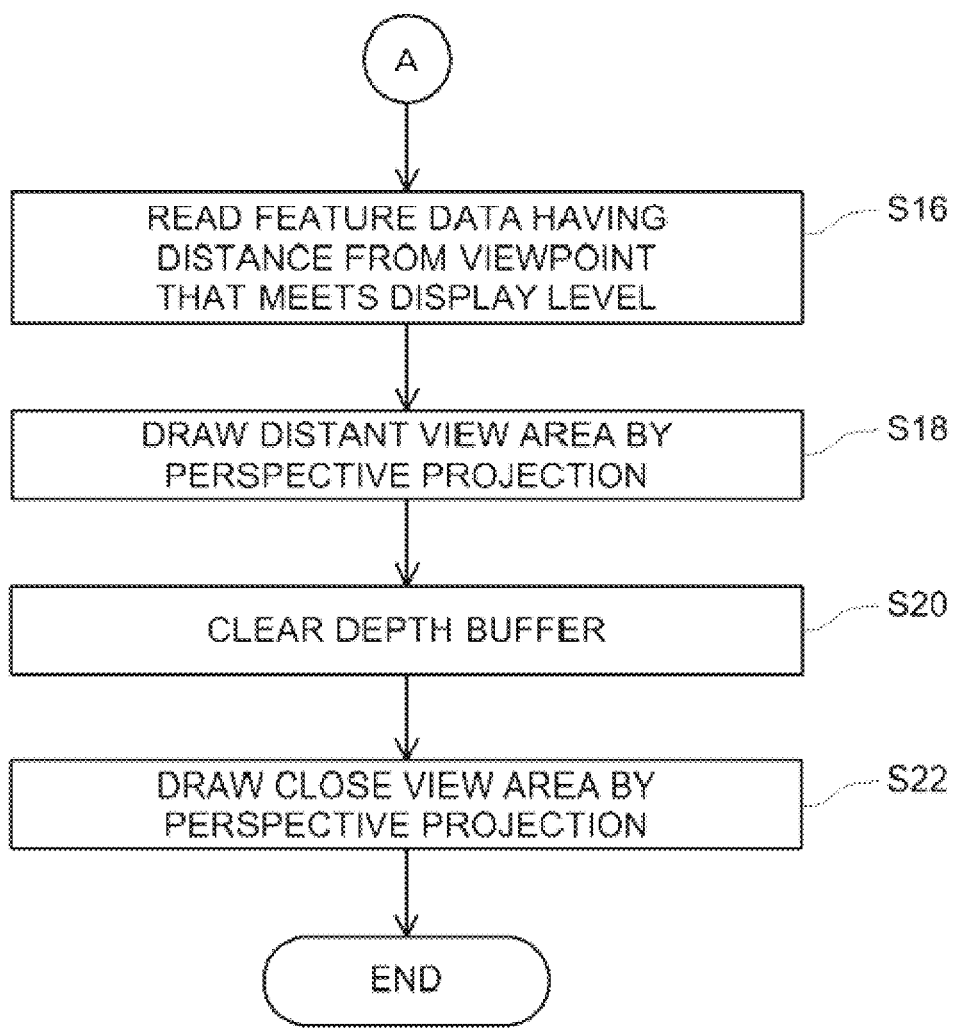
FIG. 5 is a second part of the flowchart of the map display process.

FIGS. 4 and 5 are flowcharts of the map display process. When the map display process is triggered, the CPU of the map display system 100 inputs the user's instructions regarding the viewpoint, the gaze direction and the display scale (step S10). Default settings may be used for these instructions. The CPU subsequently identifies levels and meshes, with respect to which map data are to be read (step S12). A procedure of identifying the meshes is illustrated.

The embodiment concurrently uses two map data of different levels for two areas, i.e., distant view/close view areas, to display a map. The CPU first identifies the level of each area, i.e., distant view/close view area, based on the display scale specified by the user. For example, when wide area display is specified as the display scale, the level LVa and the level LVb shown in FIG. 1 may be selected respectively for the distant view area and the close view area. When detailed display is specified as the display scale, on the other hand, the level LVb and the level LVc shown in FIG. 1 may be selected respectively for the distant view area and the close view area.

After selection of the levels, the CPU identifies meshes as the reading object of map data at each level, based on the viewpoint and the gaze direction. A procedure of identifying the meshes is illustrated. A fan-shaped range starting from the viewpoint is the display range of the map. A hatched area relatively close to the viewpoint is the close view area, and a distant white area is the distant view area.

In the map data at the level selected for the close view area, meshes overlapping with the close view area, i.e., nine meshes illustrated by the broken lines, are the reading object of map data for the close view area. Similarly, with regard to the distant view area, meshes overlapping with the distant view area, i.e., two meshes illustrated by the solid lines, are the reading object of map data for the distant view area.

According to this embodiment, a map image of the close view area is drawn over a map image of the distant view area, as described later. With respect to the distant view area, it is accordingly not necessary to limit the reading range of map data to the distant view area. For example, a range starting from the vicinity of the viewpoint and including both the close view area and the distant view area may be read, and a distant view area may be drawn by using this entire range. The CPU subsequently identifies cells, with respect to which map data are to be read, based on the map display position and the gaze direction (step S14). A method of identifying the cells is illustrated.

It is here assumed that meshes M1 and M2 are identified as the reading object by the process of step S12. Cells C1 to C6 are defined for the mesh M1 as illustrated by the broken lines. Cells C7 to C11 are defined for the mesh M2 as illustrated by the broken lines. The CPU identifies cells overlapping with a map display range V (this range is illustrated as a rectangle but is technically a fan-shaped area in perspective projection) as the reading object among the cells C1 to C11 included in the meshes M1 and M2. As a result, cells C4 to C9 are identified as the reading object in the illustrated example. This embodiment identifies the reading object in the units of cells and thereby eliminates the need to read the map data of the entire meshes M1 and M2. This advantageously reduces the time required for reading the map data.

The CPU reads feature data having the distance from the viewpoint that meets the display level, from the identified cells (step S16). For example, as shown in FIG. 3, the display level "2" indicates display of a feature located in the range from the viewpoint to the distance D3. When the feature is located farther from the distance D3 from the viewpoint, this feature is excluded from the reading object. The distance from the viewpoint to a feature used for such decision may be calculated individually for each feature or may be calculated using the representative point of a cell (for example, a point on the cell boundary closest to the viewpoint). Instead of the above process, a modified process may read all feature data from the identified cells and subsequently control display/non-display of each feature based on the display level.

After reading the feature data, the CPU draws the distant view area by perspective projection (step S18). This embodiment draws a bird's eye view from the high viewpoint, but a driver's eye view from the low viewpoint may be drawn alternatively. Map data at the level for the distant view area is used for this process. The process of step S18 stores the depth at each point into the depth buffer and performs hidden line removal.

The process of drawing the distant view area is controlled not to draw a three-dimensional feature in the vicinity of the boundary between the distant view area and the close view area. A specific procedure of such control may set a non-display area where no feature is to be displayed in the vicinity of the boundary between the distant view area and the close view area and determine whether each feature is included in this non-display area. Another available procedure may not draw any features but draw only a polygon representing the ground surface in the distant view area.

Upon completion of drawing the distant view area, the CPU clears the depth buffer (step S20). This causes the image in the distant view area (hereinafter referred to as "distant view image") to merely indicate a two-dimensional background image without information of the depth information. The CPU subsequently draws the close view area by perspective projection (step S22). The viewpoint and the gaze direction of perspective projection in drawing the close view area are the same as those in drawing the distant view area (step S18). Map data at the level for the close view area is used at step S22.

Since the depth buffer is cleared, the image in the close view area (hereinafter referred to as "close view image") is drawn over and in front of the distant view image. The depth is newly stored in the depth buffer in the course of perspective projection of the close view image, so that hidden line removal is adequately performed for the close view area.

The following describes the significance of the non-display area set in the process of drawing the distant view area.

This embodiment causes the close view image to be drawn over the distant view image by clearing the depth buffer as described above. If a three-dimensional feature is drawn in the vicinity of the boundary between the distant view image and the close view image, part of the three-dimensional feature may be unnaturally covered by the close view image. As described above, the procedure of the embodiment sets the non-display area in the distant view area in the vicinity of the boundary to prevent any three-dimensional feature from being drawn in the vicinity of the boundary, thus avoiding this potential trouble. The size of the non-display area may be set arbitrarily to achieve this purpose by taking into account the range where the close view image is drawn over the distant view image.

D. Display Examples of Three-Dimensional Maps and Advantageous Effects

FIGS. 6A through 6E are diagrams illustrating display examples of three-dimensional maps.

Figure 6A:
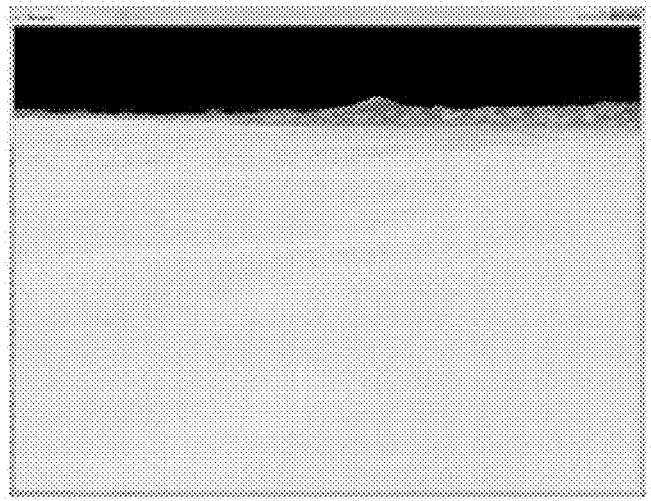
FIGS. 6A through 6E are diagrams illustrating display examples of three-dimensional maps.

FIG. 6A illustrates an exemplary distant view image. In this illustrated example, the entire range from the vicinity of the viewpoint to the long distance including a close view area is drawn as the distant view area. Although only the ground surfaces are mainly drawn as the distant view image in this illustrated example, the distant view image may include features.

Figure 6B:
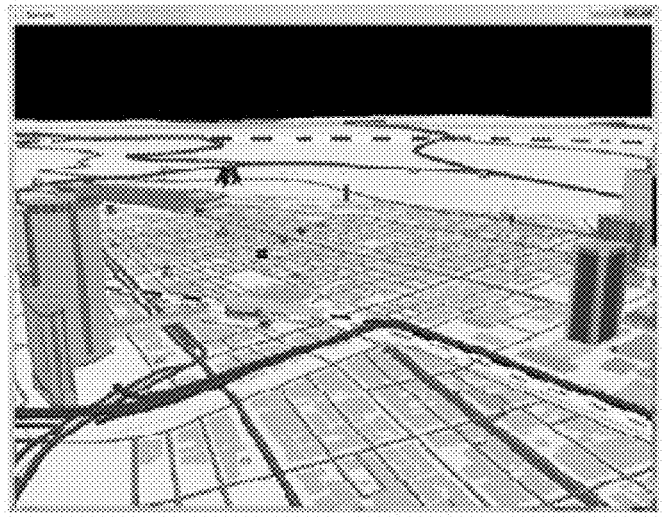

FIG. 6B illustrates an exemplary close view image. No distant view image is drawn. The drawn image is a perspective projection view in the scale range from the viewpoint set as the close view area shown in step S12 of FIG. 4. In the close view area, the roads are drawn by the bird's eye view, and the major features are drawn three-dimensionally.

Figure 6C:
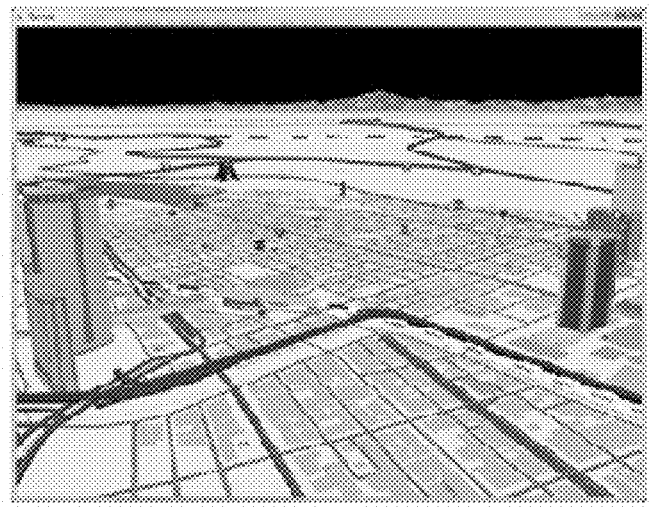

FIG. 6C illustrates a state that the close view image is superimposed on the distant view image. This is a three-dimensional map provided according to this embodiment. Mountains are displayed as the distant view image in the distant area, while roads and buildings are drawn in the close area to the viewpoint.

Figure 6D:
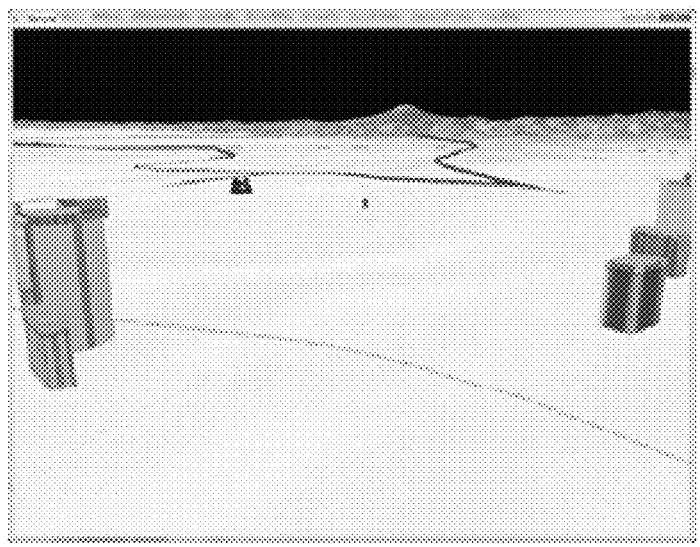

FIG. 6D illustrates an image of comparative example, in which the close view image is drawn without clearing the depth buffer after drawing of the distant view image. The roads to be drawn in the close view image are hardly drawn, and three-dimensional features are unnaturally present in this image.

Figure 6E:
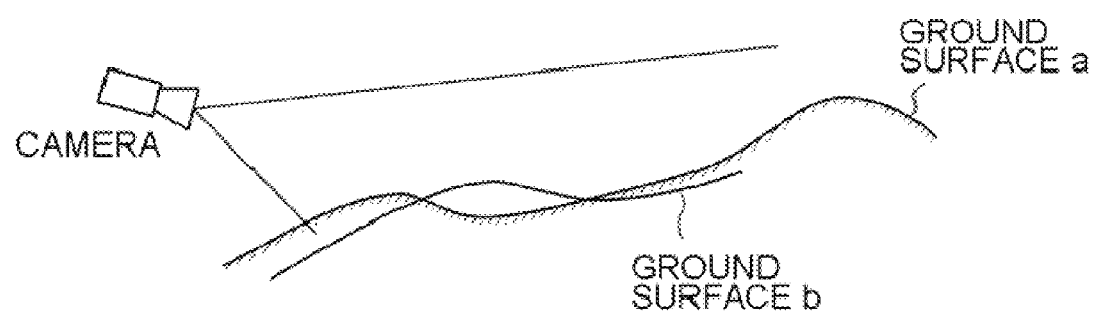

FIG. 6E is a diagram illustrating the effects of the device buffer. Ground surface a represents the ground surface in the distant view area, and ground surface b represents the ground surface in the close view area. The map data for the distant view area and the map data for the close view area respectively include errors. Superimposition of the two map data may accordingly cause the ground surface to have different heights at the respective points. If the close view area is drawn without clearing the depth buffer after drawing of the distant view area, hidden line removal is performed between the distant view image and the close view image. As a result, the close view image is covered and hidden by the ground surface of the distant view image in the part where the ground surface of the distant view area is located at the higher position than that of the ground surface of the close view area. This makes the unnatural image as shown in FIG. 6D.

The effects of the depth buffer are not limited to the case that there is a mismatch between the map data of different levels as described above. Even when the map data of different levels are perfectly matched, the effect of a rounding error in the display process may result in a mismatch in height of the ground surface as shown in FIG. 6E. When there is a perfect match in height of the ground surface between the map data of different levels, this means that a plurality of polygons are present at the point of the same depth. The graphics engine thus fails to distinctly determine which of the polygons is to be drawn in a visible manner. This may cause a phenomenon that the image flickers unstably.

The three-dimensional map display system of the embodiment clears the depth buffer after drawing a distant view image, thereby avoiding such a potential trouble and enabling a three-dimensional map of good appearance to be displayed even in the case of combined use of map data in multiple levels. The combined use of map data in multiple levels eliminates the need to read the detailed map data with respect to the distant view area. This provides the sufficiently detailed information for the near view area and uses the map data of the low data volume for the distant view area, thus enabling a map to be drawing efficiently.

Additionally, the embodiment not only stores the map data in the units of meshes but stores the map data in the units of cells as divisions of each mesh. This avoids unnecessary data from being read for displaying a map and reduces the time required for data reading to display a map.

The foregoing describes the embodiment of the invention.

The three-dimensional map display system of the invention may not necessarily have all the functions of the embodiment described above but may have only part of such functions. The three-dimensional map display system of the invention may have additional functions other than those described above.

The invention is not limited to the above embodiment but may be implemented by a variety of configurations within the scope of the invention. For example, parts configured by the hardware in the embodiment may be implemented by the software configuration, and vice versa. The invention is applicable to display a three-dimensional map by combined use of map data in multiple levels.

What is claimed is:

1. A three-dimensional map display system comprising:
a display terminal that displays a three-dimensional map;
a memory that stores a map database including map data for displaying the three-dimensional map, the map data including multiple levels of map data each having a different level of map details; and
a display controller that refers to the map database and generates the three-dimensional map viewed from a specified viewpoint position and in a specified gaze direction, thereby allowing the display terminal to display the three-dimensional map thereon,
wherein the display controller sequentially draws a plurality of view areas starting from a distant view area toward a close view area concurrently using a plurality of different levels of map data in accordance with a distance of each view area from the viewpoint position, such that the view area more distant from the viewpoint position is drawn with the map data of a rougher level having a lower level of map details, while the view area closer to the viewpoint position is drawn with the map data of a finer level having a higher level of map details,
wherein the map data includes at least:

first data of the rougher level for the distant view area having first depth information; and
second data of the finer level for a closer view area adjacent to the distant view area, the second data having second depth information, the first data and the second data overlapping each other across a border between the distant view area and the closer view area, whereby an overlapping area including the border is concurrently represented by the first data and the second data having respective depth information,
and wherein the display controller draws the overlapping area by overwriting the closer view area on the distant view area in the three-dimensional map regardless of the depth information of each point in the distant view area such that a ground surface in the overlapping area is displayed based on the second data.

2. The three-dimensional map display system according to claim 1, further comprising:
a depth buffer configured to store the depth of each point of the view area which has been drawn,
wherein the display controller clears the depth buffer immediately before drawing a next view area by changing the level of the map data.

3. The three-dimensional map display system according to claim 2, wherein the display controller controls display in a predetermined area including a boundary between a first view area and a second view area so as not to draw three-dimensional features in the first view area if the first view area is more distant from the viewpoint position than the second view area and the level of the map data changes between the first and second view areas.

4. The three-dimensional map display system according to claim 2, wherein the display controller controls display such that the distant view area includes an adjacent area overlapping with a view area closer to the viewpoint position.

5. The three-dimensional map display system according to claim 2, wherein the map data stored in the map database further includes:
display level information associated with each feature to control display/non-display of the feature according to a distance thereof from the viewpoint position, whereby the display controller displays the three-dimensional map by drawing the feature designated as a display object at a given distance from the viewpoint position based on the display level information.

6. The three-dimensional map display system according to claim 2,
wherein in the map database, the map data in each level is stored mesh by mesh, each mesh having a geographical size specified for the level,
and wherein each mesh includes:
large-size feature data for large features having a two-dimensional geographical size equal to or greater than a predetermined size; and
small-size feature data for features other than the large features the small-size feature data being in readable cell by cell, each cell having a geographical size smaller than that of the mesh, and a shape of the cell being defined by geographically dividing the mesh in such a manner that an amount of data of the features included in each cell does not exceed a predetermined value.

7. The three-dimensional map display system according to claim 1, wherein the display controller controls display in a predetermined area including a boundary between a first view area and a second view area so as not to draw three-dimensional features in the first view area if the first view area is more distant from the viewpoint position than the second view area and the level of the map data changes between the first and second view areas.

8. The three-dimensional map display system according to claim 7, wherein the display controller controls display such that the distant view area includes an adjacent view area closer to the viewpoint position.

9. The three-dimensional map display system according to claim 7, wherein the map data stored in the map database further includes:
display level information associated with each feature to control display/non-display of the feature according to a distance thereof from the viewpoint position, whereby the display controller displays the three-dimensional map by drawing the feature designated as a display object at a given distance from the viewpoint position based on the display level information.

10. The three-dimensional map display system according to claim 7, wherein in the map database, the map data in each level is stored mesh by mesh, each mesh having a geographical size specified for the level,
and wherein each mesh includes:
large-size feature data for large features having a two-dimensional geographical size equal to or greater than a predetermined size; and
small-size feature data for features other than the large features the small-size feature data being in readable cell by cell, each cell having a geographical size smaller than that of the mesh, and a shape of the cell being defined by geographically dividing the mesh in such a manner that an amount of data of the features included in each cell does not exceed a predetermined value.

11. The three-dimensional map display system according to claim 1, wherein the display controller controls display such that the distant view area includes an adjacent view area closer to the viewpoint position.

12. The three-dimensional map display system according to claim 11, wherein the map data stored in the map database further includes:
display level information associated with each feature to control display/non-display of the feature according to a distance thereof from the viewpoint position, whereby the display controller displays the three-dimensional map by drawing the feature designated as a display object at a given distance from the viewpoint position based on the display level information.

13. The three-dimensional map display system according to claim 11, wherein in the map database, the map data in each level is stored mesh by mesh, each mesh having a geographical size specified for the level,
and wherein each mesh includes:
large-size feature data for large features having a two-dimensional geographical size equal to or greater than a predetermined size; and
small-size feature data for features other than the large features the small-size feature data being in readable cell by cell, each cell having a geographical size smaller than that of the mesh, and a shape of the cell being defined by geographically dividing the mesh in such a manner that an amount of data of the features included in each cell does not exceed a predetermined value.

14. The three-dimensional map display system according to claim 1, wherein the map data stored in the map database further includes:
  display level information associated with each feature to control display/non-display of the feature according to a distance thereof from the viewpoint position, whereby the display controller displays the three-dimensional map by drawing the feature designated as a display object at a given distance from the viewpoint position based on the display level information.

15. The three-dimensional map display system according to claim 14, wherein in the map database, the map data in each level is stored mesh by mesh, each mesh having a geographical size specified for the level,
  and wherein each mesh includes:
    large-size feature data for large features having a two-dimensional geographical size equal to or greater than a predetermined size; and
    small-size feature data for features other than the large features the small-size feature data being in readable cell by cell, each cell having a geographical size smaller than that of the mesh, and a shape of the cell being defined by geographically dividing the mesh in such a manner that an amount of data of the features included in each cell does not exceed a predetermined value.

16. The three-dimensional map display system according claim 1, wherein in the map database, the map data in each level is stored mesh by mesh, each mesh having a geographical size specified for the level,
  and wherein each mesh includes:
    large-size feature data for large features having a two-dimensional geographical size equal to or greater than a predetermined size; and
    small-size feature data for features other than the large features the small-size feature data being in readable cell by cell, each cell having a geographical size smaller than that of the mesh, and a shape of the cell being defined by geographically dividing the mesh in such a manner that an amount of data of the features included in each cell does not exceed a predetermined value.

17. A method for displaying a three-dimensional map performed by a computer including a map database that stores multiple levels of map data for displaying the three-dimensional map, the map data in each level having a different level of map details, the method comprising:
  referring to the map database; and
  displaying the three-dimensional map viewed from a specified viewpoint position and in a specified gaze direction, the displaying the three-dimensional map comprising:
    concurrently using a plurality of different levels of the map data, thereby sequentially drawing a plurality of view areas starting from a distant view area toward a close view area in accordance with a distance of each view area from the viewpoint position, such that the view area more distant from the viewpoint position is drawn with the map data at a rougher level having a lower level of map details, while the view area closer to the viewpoint position is drawn with the map data at a finer level having a higher level of map details, the map data including at least:
      first data of the rougher level for the distant view area having first depth information; and
      second data of the finer level for a closer view area adjacent to the distant view area, the second data having second depth information, the first data and the second data overlapping each other across a border between the distant view area and the closer view area, whereby an overlapping area including the border is concurrently represented by the first data and the second data having respective depth information; and
    drawing the overlapping area by overwriting the closer view area on the distant view area in the three-dimensional map regardless of the depth information of each point in the distant view area such that a ground surface in the overlapping area is displayed based on the second data.

18. A non-transitory computer readable medium storing a computer program that causes a computer to display a three-dimensional map, the computer including a map database that stores multiple levels of map data for displaying the three-dimensional map, the map data in each level having a different level of map details, the computer program causing the computer to implement a display control function comprising the steps of:
  referring to the map database; and
  displaying the three-dimensional map viewed from a specified viewpoint position and in a specified gaze direction, the displaying the three-dimensional map comprising:
    concurrently using a plurality of different levels of the map data, thereby sequentially drawing a plurality of view areas starting from a distant view area toward a close view area in accordance with a distance of each view area from the viewpoint position, such that the view area more distant from the viewpoint position is drawn with the map data at a rougher level having a lower level of map details, while the view area closer to the viewpoint position is drawn with the map data at a finer level having a higher level of map details, the map data including at least:
      first data of the rougher level for the distant view area having first depth information; and
      second data of the finer level for a closer view area adjacent to the distant view area, the second data having second depth information, the first data and the second data overlapping each other across a border between the distant view area and the closer view area, whereby an overlapping area including the border is concurrently represented by the first data and the second data having respective depth information; and
    drawing the overlapping area by overwriting the closer view area on the distant view area in the three-dimensional map regardless of the depth information of each point in the distant view area such that a ground surface in the overlapping area is displayed based on the second data.

* * * * *